United States Patent [19]

Chubb

[11] 4,155,981
[45] May 22, 1979

[54] RECTANGULAR CELL HONEYCOMB CHEMICAL CONVERTER-HEAT EXCHANGER

[75] Inventor: Talbot A. Chubb, Arlington, Va.

[73] Assignee: The United States of America as represented by the Secretary of the Navy, Washington, D.C.

[21] Appl. No.: 876,439

[22] Filed: Feb. 9, 1978

[51] Int. Cl.² .................. B01J 8/00; F24J 3/02; F28D 7/02
[52] U.S. Cl. .................. 422/198; 126/263; 126/270; 165/165; 165/DIG. 17; 422/211
[58] Field of Search .......... 23/252 R, 284, 288 R, 23/288 K, 288 FC; 126/263, 400, 270 (U.S. only), 271 (U.S. only); 165/165, DIG. 17

[56] References Cited

U.S. PATENT DOCUMENTS

| | | | |
|---|---|---|---|
| 2,392,875 | 1/1946 | Porter | 23/288 R X |
| 2,415,531 | 2/1947 | Porter | 23/288 R X |
| 3,109,715 | 11/1963 | Johnson et al. | 23/288 R |
| 3,199,960 | 8/1965 | Sowerby | 23/285 |
| 3,902,474 | 9/1975 | Pyle | 126/270 |
| 3,923,466 | 12/1975 | Seelig et al. | 23/288 K X |
| 3,972,183 | 8/1976 | Chubb | 126/263 X |
| 4,018,211 | 4/1977 | Barr | 126/270 |
| 4,038,969 | 8/1977 | Smith | 126/270 |
| 4,062,352 | 12/1977 | Lesk | 126/271 |
| 4,101,287 | 7/1978 | Sweed et al. | 23/288 K |

Primary Examiner—Joseph Scovronek
Attorney, Agent, or Firm—R. S. Sciascia; Philip Schneider; Melvin L. Crane

[57] ABSTRACT

A chemical converter-heat exchanger formed by a plurality of rows of parallel, horizontal channels in a housing through which an inflowing fluid is heated. Vertical columns of horizontal channels connect alternately with an inlet and outlet manifold and carry the fluid back and forth horizontally in vertical columns of horizontal channels so that the inflowing fluid is partially heated by the outflowing fluid. Means are provided so that the bottom face of the housing is heated by the sun which in turn heats the fluid as the fluid passes through the bottom channels in the housing. A plurality of units may be mounted together to increase the output.

2 Claims, 5 Drawing Figures

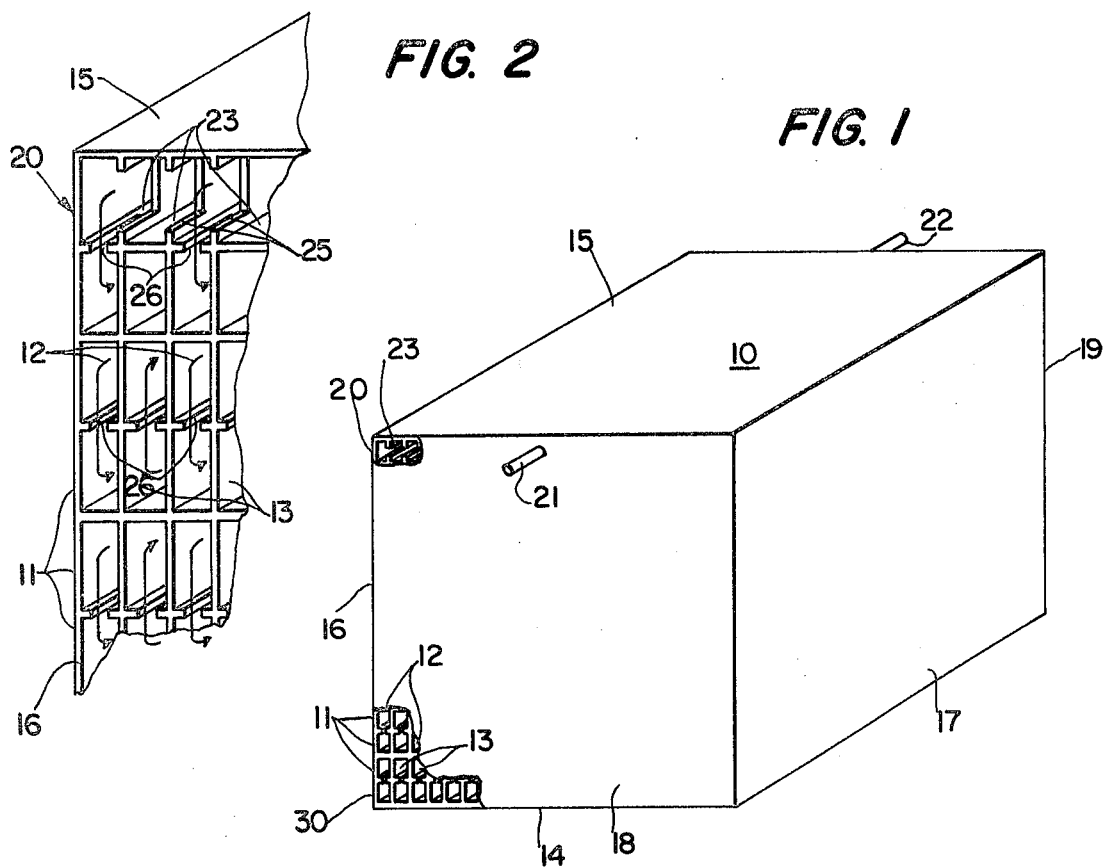
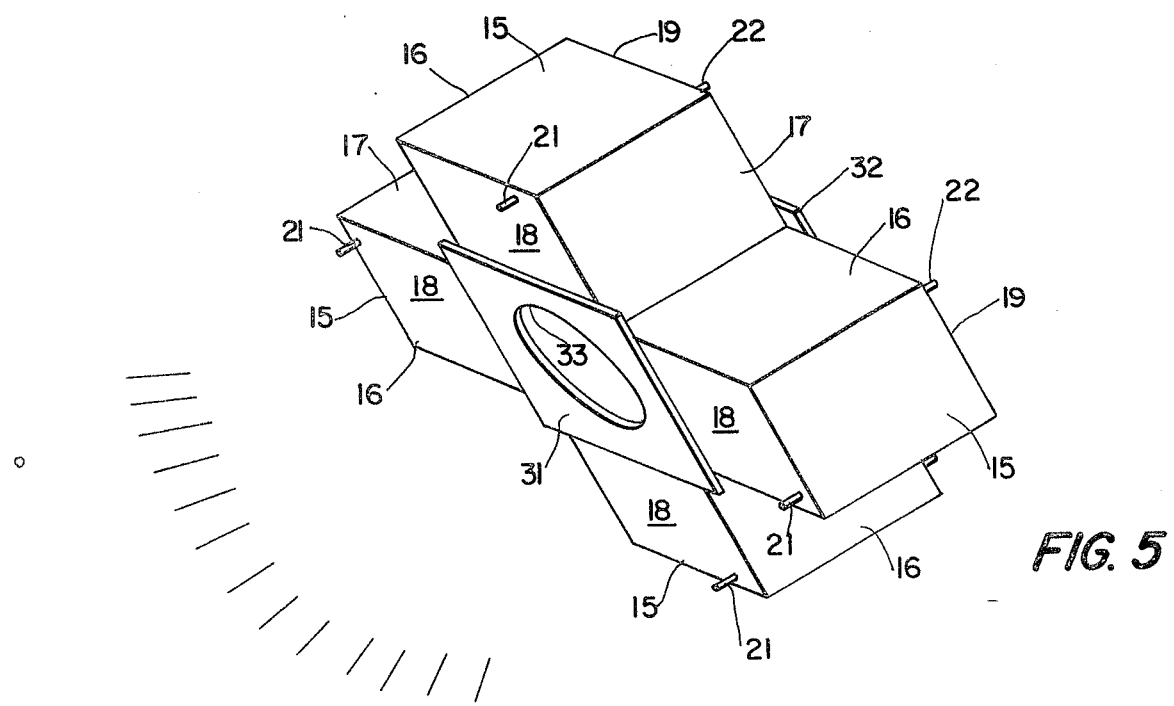

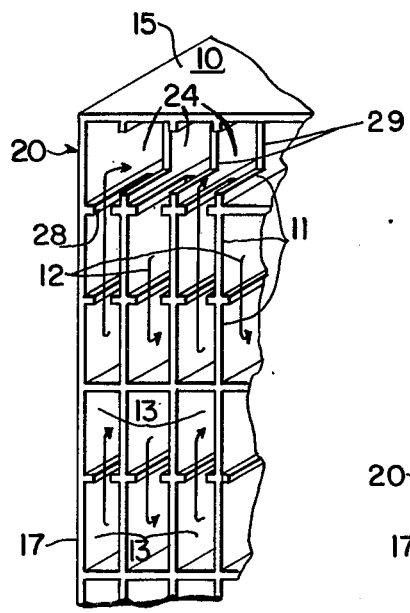
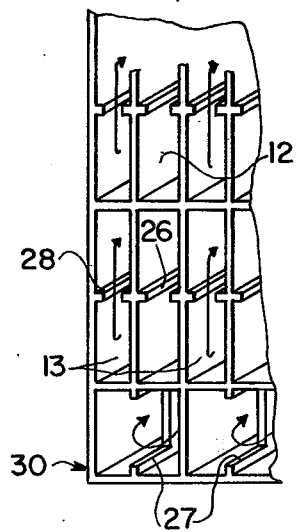
FIG. 4
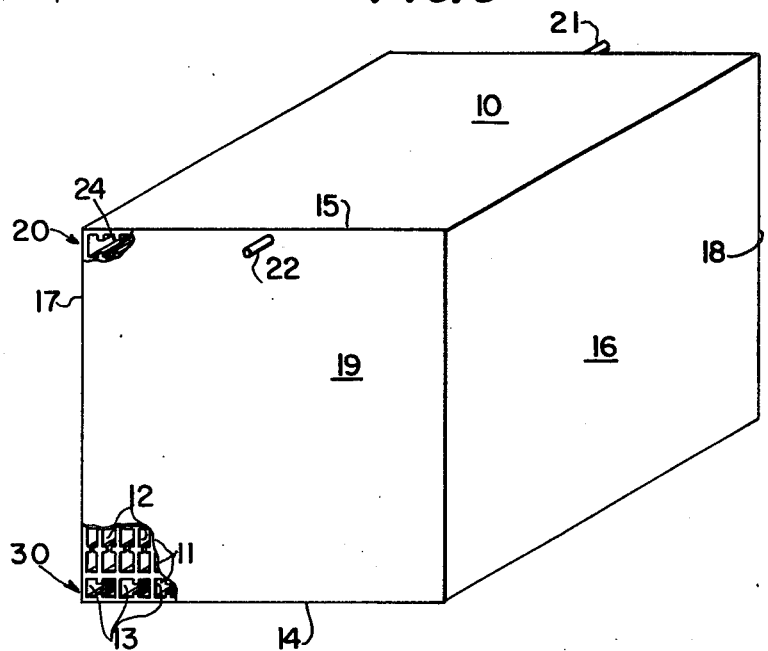
FIG. 3

[4,155,981]

RECTANGULAR CELL HONEYCOMB CHEMICAL CONVERTER-HEAT EXCHANGER

BACKGROUND OF THE INVENTION

This invention relates to solar devices and more particularly to a solar heater and chemical converter-heat exchanger.

It is well known that solar energy is inexhaustible and can replace other types of energy which are normally used as heat sources and can be used for the production of electricity. Many solar systems have been patented for heating homes, heating swimming pools, heating water, exciting solar cells, etc. Some of the problems involve collecting the energy from the sunlight, and the system for delivery of the useful energy to a central system for further processing. U.S. Pat. No. 3,972,183 sets forth a closed cycle chemical system for effecting energy capture and transport of the captured energy to a useful conversion system. In the patented system, a small sunlight collector-chemical converter receives the inflow of a chemical working fluid and concentrated sunlight disassociates portions of the inflowing chemical working fluid in a catalytic converter chamber. The arrangement of the system is such that hot outflowing fluid heats inflowing fluid in a counter-current heat exchanger to deliver cooled outflowing fluid to external piping lines. Other solar heat systems have been patented which heat fluids directly and deliver the heated fluids to heat-conversion systems for useful purposes.

SUMMARY OF THE INVENTION

A converter-heat exchanger for heating a fluid by solar radiation. The system may iclude a catalyst which, due to the heat, disassociates the fluid with absorption of heat which fluid is cooled in order to transport the fluid at a cooler temperature than without the chemical conversion. The heat exchanger is configured such that the outgoing fluid heats the incoming fluid thereby acting as a preheater while cooling the outflowing fluid. The incoming fluid is routed through inflow channels to a "hot plate" or heat cavity where it is heated to its maximum by solar radiation and then it is routed out through outflow channels to the output. The inflow and outflow channels are adjacent each other with adjacent inflow and outflow columns operating in pairs; therefore the fluid is affected by the closeness of the channels as the fluid is forced into, through, and out of the heat exchanger.

BRIEF DESCRIPTION OF THE DRAWINGS

FIG. 1 is a perspective view of a converter-heat exchanger assembly with a portion of the inlet end cutaway to show the inner parts.

FIG. 2 is an enlarged partial view illustrating the rectangular cellular honeycomb inner structure through which fluid enters and passes.

FIG. 3 illustrates a view of the outlet side with a portion of the end plate removed.

FIG. 4 is an enlarged view illustrating a portion of the top and bottom of the outlet side of the heat exchanger.

FIG. 5 illustrates an assembly including four converter-heat exchange assemblies such as illustrated in FIG. 1.

DETAILED DESCRIPTION

The converter-heat exchanger is formed by an extruded rectangular cell honeycomb 10, see FIG. 1, comprising a plurality of rows of parallel rectangular channels 11 with each row containing alternately a plurality of inflow and outflow channels with the horizontal channels arranged in vertical inflow columns 12 and outflow columns 13. The channels are enclosed by a bottom wall 14, a top wall 15, and side walls 16 and 17 with an inlet end plate 18 and an outlet end plate 19 secured to the open ends of the channels. The first and second, third and fourth, fifth and six, etc., columns form inlet-outlet pairs which cooperate together in passage of the fluid from an inlet to an outlet. The honeycomb is formed from low-thermal-expansion ceramic material by a known extrusion process and the end plates are secured thereto by a ceramic cement applied onto the inside surface of each end plate and then cured. It has been determined that each end plate should be secured in place separately by placing the honeycomb structure onto the end plate while the plate is in a horizontal position with the channels in the vertical direction and curing each end in two separate operations.

The inlet end plate is provided with an inlet tube 21 which opens into an inlet manifold 23, near the top wall on the inlet side, FIG. 2, and the outlet end plate is provided with an outlet tube 22 which opens into an outlet manifold 24 near the top wall on the output side of the upmost row of channels, FIG. 4.

In order to use the above assembled honeycomb structure as a chemical converter-heat exchanger, the ends of each of the rectangular honeycomb channels near the end plates must be modified to allow fluid to flow between the vertically stacked channels. Fluid admitted under pressure through inlet tube 21 enters the inlet manifold and is transmitted back and forth in adjacent inflow vertical columns of aligned horizontal channels from the top row 20 to the bottom row 30 in adjacent pairs of inflow and outflow columns. The fluid in the bottom inflow channels and outflow channels flows along the bottom plate which is heated by solar energy. The outflowing fluid is transmitted from the inflowing channels to the outflowing channels and flows along the bottom outflow channels and then upwardly back and forth through adjacent horizontal, vertically aligned channels in alternate outflow columns, to the output manifold at the upper row of channels. The outflow fluid flows in columns 13 alternately with the inflowing fluid flow columns 12 with each adjacent inflow-outflow pair across the width forming the inflow and outflow channels.

In order to permit the fluid flow described above, each channel of the upper row of channels is sealed off from through-flow at its center by any suitable means so that the inflowing fluid does not flow directly to the outflow side of the heat-converter and the outflowing fluid cannot back-up into the inflowing fluid. Since there is only one inlet tube and there are a plurality of inlet passages in the uppermost horizontal row of channels, the vertical partitions 25 of each of the channels of the uppermost row of channels are cut away on the fluid inflow end of the channels near the inlet end plate thus permitting fluid to flow horizontally from the inlet tube to all of the fluid inflow channels. The bottom partitions 26 (FIG. 2) in alternate channels (first, third, fifth, etc.) of the uppermost row of channels and in alternate ends of each channel of each alternate vertical column are also cut away to permit inflow fluid from the uppermost channel to flow to the corresponding lower channels in the next lower rows of each of the inflow columns. The bottom horizontal partition 26 of one of each of the channels in the inflow columns through which the inflow fluid flows is cut away so that the fluid flows back and forth from the uppermost row 20 through each successive channel in each inflow column to the lowermost row of channels in each of the columns. In the lowermost row of channels 30, the inflow fluid flows along the bottom wall of the honeycomb to the end of the channel where the vertical partitions 27 (FIG. 4) between adjacent inflow and outflow passages are cut away near the end plate 19 thereof to permit the inflow fluid to transfer to the adjacent outflow column along the bottom wall 14. The outflow fluid flows along the bottom wall paralleling the inflow fluid to the opposite end of the outflow channels where the upper partition 28 of each of the outflow channels is cut away to permit outflow fluid to enter the next upper adjacent channel of its associated outflow column. Opposite ends of alternate channels in the outflow columns are cut to permit outflow fluid to flow back and forth to the uppermost row of channels where the vertical partitions 29 (FIG. 4) separating each of the channels on the outflow ends are cut away near the end closure plate to permit flow of fluid from each outflow column to the outflow manifold and out the outflow tube. Since each of the channels in the uppermost row 20 are partitioned off from the inflow fluid, the outflow fluid will not mix with the inflow fluid. The cut ends and partitions of the upper row of channels and inflow columns are shown in FIGS. 1 and 2 and the lowermost row 30 and uppermost row for the outflow ends are shown in FIGS. 3 and 4. As shown in FIGS. 3 and 4, columns 1 and 2, 3 and 4, 5 and 6, etc., combine to form inflow-outflow column pairs which cooperate with each other to permit inflow and outflow fluid paths.

In operation of the assembly shown in FIGS. 1-4, the bottom plate is heated by solar radiation which produces a temperature gradient between the bottom plate and the upper plate. The upper plate will be nearer the temperature of the surrounding temperature than either of the sides or ends. Fluid enters through the inlet tube to the inlet manifold and flows in each direction horizontally to the alternate inflow columns where the fluid is directed back and forth along adjacent channels of each fluid inflow column to the bottom row of channels. The inflow fluid enters the bottom inflow channel at one end and flows along the bottom "hot plate" to the opposite end of the channels where the fluid enters the bottom outflow channels. The bottom row of outflow channels receives the fluid from the inflow channels and directs the fluid back along the bottom "hotplate" in the outflow columns. The fluid flows back and forth through each adjacent vertically stacked outflow channel of each outflow column to the outflow manifold along the uppermost outflow row. The fluid in each column flows together in the outflow manifold and out through the outflow tube 22.

Since the inflow fluid columns parallel and alternate with the outflow fluid columns, the inflow fluid will be heated by the outflow fluid as the inflow fluid progresses back-and-forth from the uppermost row of channels to the bottom row of channels. Likewise, the outflow fluid will be cooled as the fluid progresses back-and-forth along the outflow channels in each of the outflow columns due to transfer of heat to the inflow fluid.

Each of the channels of the lowermost row of channels may be filled with a catalyst which may be held in place by a suitable screen through which the fluid may flow. The catalyst may be in the form of cylindrical ceramic beads coated with platinum and placed loosely within all of the channels of the bottom row.

The chemical converter-heat exchanger of this invention may replace the solar collector gas dissociation device described in U.S. Pat. No. 3,972,183 wherein sulfur trioxide $SO_3$ is heated to about 950° by the sun in the bottom row of channels. The $SO_3$ dissociates into $SO_2+O_2$ with absorption of heat. The $SO_2+O_2+$heat are directed through the outflow channels where the heated gas is cooled by the inflowing gas by absorbing heat from the outflowing gas. (The reason for the cooling is that the gas is heated to a higher temperature than is desirable when the gas is being transported to another location.) The heated gas is then directed to a gas conversion chamber such as shown in U.S. Pat. No. 3,972,183 where the heat is given off and the gas recombines into $SO_3$. The $SO_3$ is then pumped back to the chemical converter-heat exchanger to be heated again in a continuous cycle. The heat given off in the heat conversion chamber may be used to convert water to steam for generating electrical energy by a steam-generator.

The chemical converter can be used as a single unit or as an assembly including a plurality of units. FIG. 5 illustrates four units assembled together with their bottom plates forming a cavity which is heated by concentrated solar energy. The cavity is formed by the four bottom plates with front and back plates 31 and 32, secured to each of the units. The front plate 31 is made with a circular aperture 33 therein through which sunlight is delivered to the cavity interior by any suitable reflecting means. In order to avoid loss of heat, the outside surfaces of the front and back plates may be covered with a suitable insulation. With improved technology, assemblies such as shown in FIG. 5 may be extruded as one integral unit.

Obviously many modifications and variations of the present invention are possible in light of the above teachings. For example the channels shown in FIGS. 1 and 2 may be square or circular. Structures with close packed hexagonal or circular channels with cuts topologically equivalent to the structure shown in FIGS. 1 and 2 are suitable structures. Also individual layers of channels may be blocked off by ceramic plugs and used as internal insulation between layers providing that suitable cuts in horizontal partitions 26 are provided so that fluid flow will not be blocked. It is therefore to be understood that within the scope of the appended claims the invention may be practiced otherwise than as specifically described.

What is claimed and desired to be secured by Letters Patent of the United States is:

1. A chemical converter-heat exchanger which comprises:
   a honeycomb structure formed by a plurality of vertical columns of horizontal channels lying side by side, the structure being enclosed by a top wall, bottom wall and side walls with each of said channels formed by horizontal and vertical partitions,
   said plurality of vertical columns of parallel channels including an upper row and a bottom row;

a first end plate enclosing one end of each of said horizontal channels;

a second end plate enclosing the other end of each of said horizontal channels;

said vertical partitions of each channel of said upper row having a portion near said first end plate and a portion near said second end plate excised to form an inlet manifold along said first end plate and an outlet manifold directly opposite said inlet manifold along said second end plate;

inlet means in said first end plate joining with said inlet manifold;

outlet means in said second end plate joining with said outlet manifold;

means within each channel of said upper row of channels to prevent flow of fluid from said inlet manifold into said outlet manifold;

fluid inflow columns formed by adjacent vertically aligned horizontal channels stacked between said upper row of channels and said bottom row of channels;

fluid outflow columns formed by adjacent vertically aligned horizontal channels stacked between said bottom row of channels and said upper row of channels.

said inflow and outflow columns alternating across the width of said honeycomb structure;

each of said inflow channels and said outflow channels including a slit near one end in each of the partitions separating each of said vertically aligned channels between said upper row of channels and said bottom row of channels with the slit in successive partitions alternately adjacent said first and second end plates in order to permit inflow fluid to flow back and forth through successive channels from said fluid inlet manifold to said bottom channels and to flow from said bottom channel through successive fluid outflow channels to said fluid outflow manifold, and slots in the vertical partitions separating adjacent inflow and outflow channels in said bottom row of channels to permit fluid to flow from one bottom inflow channel to its adjacent bottom outflow channel;

whereby inflow fluid may be heated by said bottom wall and directed from said inflow channels into said outflow channels and out through said fluid outflow channel and into said outflow manifold along the upper row of channels.

2. A chemical converter-heat exchanger as claimed in claim 1 in which:

said bottom row of channels include a catalyst therein.

* * * * *